US010733869B2

(12) United States Patent
Golob (10) Patent No.: US 10,733,869 B2
(45) Date of Patent: Aug. 4, 2020

(54) CARBON MONOXIDE DETECTION AND WARNING SYSTEM FOR A PORTABLE PHONE DEVICE

(71) Applicant: Carrier Corporation, Palm Beach Gardens, FL (US)

(72) Inventor: Michael Lawrence Golob, Sarasota, FL (US)

(73) Assignee: Carrier Corporation, Palm Beach Gardens, FL (US)

( * ) Notice: Subject to any disclaimer, the term of this patent is extended or adjusted under 35 U.S.C. 154(b) by 0 days.

(21) Appl. No.: 16/245,771

(22) Filed: Jan. 11, 2019

(65) Prior Publication Data

US 2019/0221101 A1 Jul. 18, 2019

Related U.S. Application Data

(60) Provisional application No. 62/617,895, filed on Jan. 16, 2018.

(51) Int. Cl.
*G08B 21/14* (2006.01)
*H04W 4/80* (2018.01)
(Continued)

(52) U.S. Cl.
CPC .............. *G08B 21/14* (2013.01); *G08B 3/10* (2013.01); *G08B 5/22* (2013.01); *G08B 21/182* (2013.01); *H04M 1/026* (2013.01); *H04W 4/80* (2018.02)

(58) Field of Classification Search
CPC ........ G08B 21/14; G08B 21/182; G08B 5/22; G08B 3/10; H04M 1/026; H04W 4/80
See application file for complete search history.

(56) References Cited

U.S. PATENT DOCUMENTS

| 7,109,859 B2 | 9/2006 | Peeters |
| 9,123,221 B2 | 9/2015 | Puskarich |

(Continued)

FOREIGN PATENT DOCUMENTS

| CN | 202841278 U | 3/2013 |
| CN | 205356452 U | 6/2016 |

(Continued)

OTHER PUBLICATIONS

Extended European Search Report dated Apr. 5, 2019, issued during the prosecution of European Patent Application No. 19150949.6 (9 pages).

*Primary Examiner* — Ryan W Sherwin
(74) *Attorney, Agent, or Firm* — Locke Lord LLP; Scott D. Wofsy; Joshua L. Jones (57) ABSTRACT

A carbon monoxide gas detection and warning system for a portable phone device is disclosed which includes a phone case dimensioned and configured to receive a portable phone device, the phone case having a raised outer shell portion that includes at least one sensing port communicating with a corresponding sensing chamber formed within a wall of the shell, and a sensing circuit embedded in the shell of the phone case, the sensing circuit including a carbon monoxide sensor operatively associated with the sensing chamber of the at least one sensing port for generating a gas detection signal upon detecting the presence of carbon monoxide gas in the sensing chamber, and a controller for receiving the gas detection signal from the carbon monoxide sensor and for periodically sending an output signal to the portable phone device by way of a wireless transmitter.

23 Claims, 6 Drawing Sheets

(51) Int. Cl.
*G08B 3/10* (2006.01)
*G08B 5/22* (2006.01)
*G08B 21/18* (2006.01)
*H04M 1/02* (2006.01)

(56) References Cited

U.S. PATENT DOCUMENTS

| | | |
|---|---|---|
| 9,167,100 B2 | 10/2015 | Bang |
| 9,241,054 B1 | 1/2016 | Roberts |
| 9,506,901 B2 | 11/2016 | Lewis |
| 9,772,227 B2 | 9/2017 | Scott et al. |
| 9,817,445 B1 | 11/2017 | Greene, Jr. et al. |
| 2009/0176473 A1* | 7/2009 | Fellner ............... H04M 1/0235 455/404.4 |
| 2013/0344609 A1 | 12/2013 | Mayer et al. |
| 2014/0200054 A1 | 7/2014 | Fraden |
| 2015/0182146 A1 | 7/2015 | Hidaka |
| 2015/0219608 A1* | 8/2015 | Choi ................ G01N 33/0004 73/23.2 |
| 2015/0247831 A1 | 9/2015 | Lewis |
| 2015/0263777 A1 | 9/2015 | Fraden |
| 2017/0046938 A1 | 2/2017 | Hummer |
| 2017/0318135 A1 | 11/2017 | Han et al. |
| 2017/0318136 A1* | 11/2017 | Han ................... H04M 1/0202 |

FOREIGN PATENT DOCUMENTS

| | | |
|---|---|---|
| CN | 106453705 A | 2/2017 |
| DE | 102006061686 A1 | 7/2008 |
| JP | 2008102571 A | 5/2008 |
| JP | 2012003458 A | 1/2012 |

\* cited by examiner

CARBON MONOXIDE DETECTION AND WARNING SYSTEM FOR A PORTABLE PHONE DEVICE

CROSS REFERENCE TO RELATED APPLICATIONS

This Application claims benefit of priority of U.S. Provisional Patent Application No. 62/617,895 filed on Jan. 16, 2018. The entire contents of this application is incorporated herein by reference in its entirety.

BACKGROUND OF THE INVENTION

Carbon Monoxide (CO) is a silent killer. The gas is odorless, tasteless and colorless and therefore, it gives no evidence of its existence. Exposure to CO can arise from many sources. Household appliances such as gas stoves and ovens, central heating systems, water heaters, cookers and open fires can be possible sources of CO gas in a home. CO can also arise from an improperly vented generator in a home or business, or from a car left running in a closed garage. Unless a CO detector is fixed in place in the location of exposure, there will be no alert and lives may be lost to CO poisoning.

Unfortunately, CO detectors are not always installed in many potential danger spots, such as in a garage enclosure, in a construction site where power is supplied by a temporary generator, or in a structure in which building codes do not require the installation of a CO detector. In most of these locations however, people are typically in possession of a portable phone device, and in most instances, that portable phone device is enclosed with a protective phone case.

SUMMARY OF THE DISCLOSURE

The subject invention is directed to a new and useful carbon monoxide gas detection and warning system for a portable phone device. The system is designed to protect people in enclosed spaces that are not typically protected by a fixed CO detector, such as, for example, garages where cars may be left running, construction sites where power may be provided by a temporary gas generator, or in structures where building codes do not require installation of a CO detector, among many others.

The carbon monoxide detection and warning system includes a phone case that is dimensioned and configured to receive a portable phone device, such as for example an Apple iPhone. The phone case is preferably made from an impact resistant plastic or rubberized material. It has a raised outer shell portion that includes at least one sensing chamber formed within one or more of the walls thereof. The at least one sensing chamber preferably has a depth of about 20 mm and a width of about 30 mm. The at least one sensing chamber communicates with a corresponding sensing port provided on an outer surface of the shell. For example, the sensing port can be provided on a rear outer surface of the shell or on a side outer surface of the shell.

A sensing or detection circuit is preferably embedded in the raised outer shell portion of the phone case, and it includes a carbon monoxide sensor that is operatively associated with the at least one sensing chamber. The sensing circuit is configured to generate a gas detection signal upon detection of carbon monoxide in the at least one sensing chamber. The sensing circuit is further configured to send an output signal to the portable phone device that is indicative of the presence of carbon monoxide in the at least one sensing chamber.

The system further includes a gas detection application that is stored on the portable phone device. The gas detection application is operative to receive the output signal from the sensing circuit embedded in the phone case and to determine if the carbon monoxide concentration present in the at least one sensing chamber exceeds a specified alarm level.

The gas detection application stored on the portable phone device is preferably programmed to cause the portable phone device to emit an alarm signal if the carbon monoxide concentration present in the at least one sensing chamber exceeds a specified threshold alarm level. The alarm signal can be a visible warning signal and/or an audible warning signal.

Preferably, the embedded sensing circuit includes a power source, which may be a rechargeable or replaceable battery. It further incudes a main control unit or controller for receiving the gas detection signal from the carbon monoxide sensor(s) and for periodically sending the output signal to the portable phone device by way of a wireless transmitter. Preferably, the sensing circuit generates a wireless Bluetooth signal. The sensing circuit further includes an antenna connected to the wireless transmitter.

The subject invention is also directed to a carbon monoxide gas detection system for a portable phone device that includes a phone case dimensioned and configured to receive a portable phone device, the phone case having an outer shell portion that includes at least one sensing port communicating with a corresponding sensing chamber formed within a wall of the outer shell portion, and a sensing circuit embedded in the outer shell portion of the phone case, the sensing circuit including a carbon monoxide sensor operatively associated with the sensing chamber of the at least one sensing port for generating a gas detection signal upon detecting the presence of carbon monoxide gas in the sensing chamber, and a controller for receiving the gas detection signal from the carbon monoxide sensor and for periodically sending an output signal to the portable phone device by way of a wireless transmitter.

A gas detection application is stored on the portable phone device that is operative to receive the periodic output signal from the wireless transmitter of the sensing circuit and to determine if the carbon monoxide concentration present in the sensing chamber exceeds a specified threshold alarm level. The gas detection application is programmed to cause the portable phone device to issue an alarm signal when the carbon monoxide concentration present in the sensing chamber exceeds the specified threshold alarm level.

These and other features of the subject invention and the manner in which it is employed will become more readily apparent to those having ordinary skill in the art from the following enabling description of the preferred embodiments of the subject invention taken in conjunction with the several drawings described below.

BRIEF DESCRIPTION OF THE DRAWINGS

So that those skilled in the art will readily understand how to make and use the carbon monoxide detection system of the subject invention without undue experimentation, preferred embodiments thereof will be described in detail herein below with reference to the figures wherein.

DETAILED DESCRIPTION OF THE PREFERRED EMBODIMENTS

Given the ubiquitous nature of portable phones, it would be beneficial to embed a CO detection circuit within a portable phone case that can measure CO levels in an enclosed area not protected by a fixed CO detector, and send those readings to a gas detection application stored on the phone device. The gas detection application could then cause the phone device to issue an alarm signal in the event that a dangerous level of CO is detected. Such a detection and warning system would undoubtedly save many lives by preventing CO poisoning.

The subject disclosure relates to life safety devices, and more particularly, to a carbon monoxide detection and warning system that includes a carbon monoxide detector embedded in a phone case for a portable phone device and a gas detection application stored on the portable phone device, which communicates with the carbon monoxide detector in the phone case to determine whether an alarm warning should be issued by the phone device.

Figure 1:
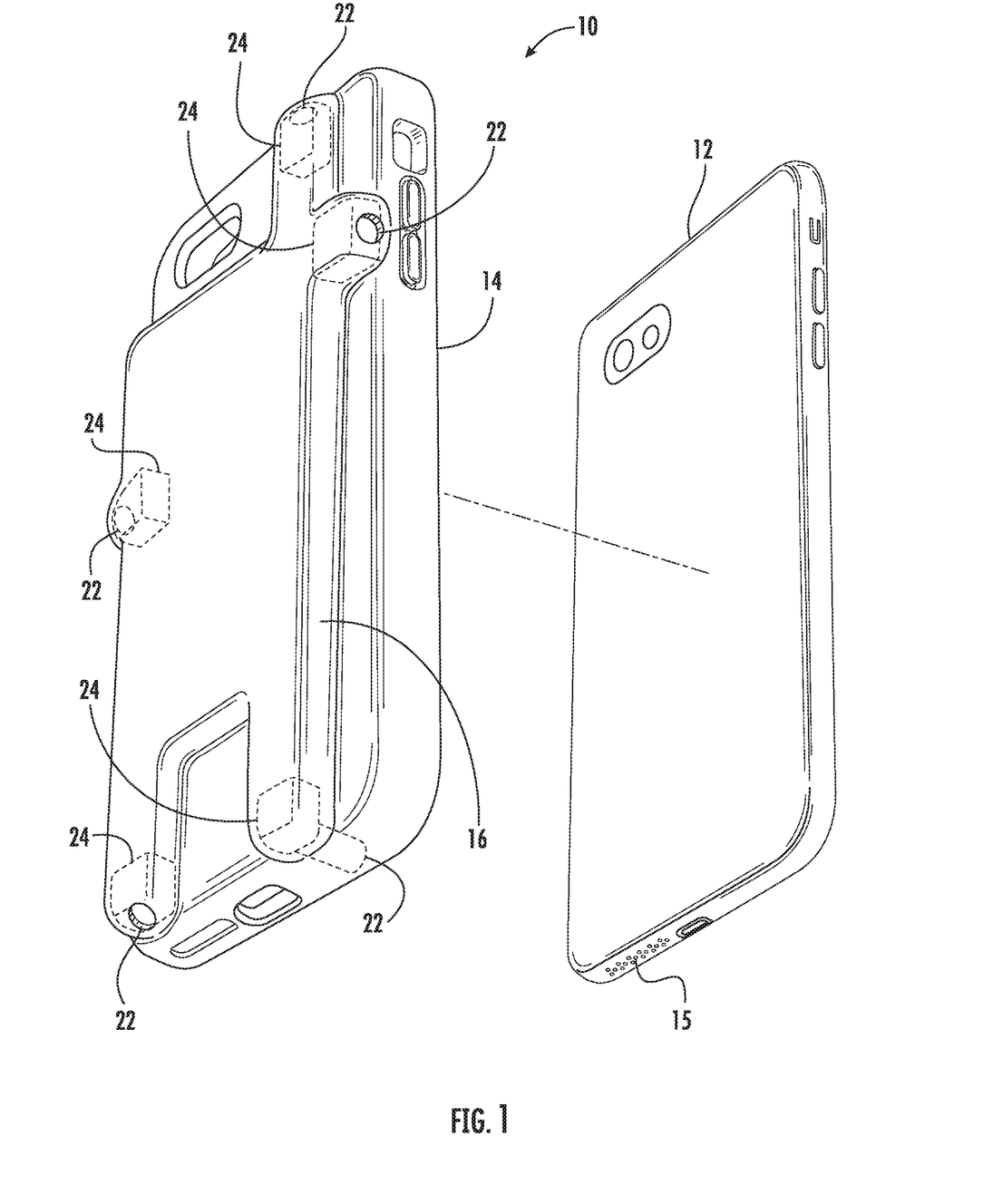
FIG. 1 is a perspective view of the carbon monoxide gas detection system of the subject invention, which includes a portable phone device having stored therein a gas detection algorithm, and a phone case for the portable phone device which has a gas detection circuit embedded therein for sensing carbon monoxide.

Referring now to the drawings wherein like reference numerals identify similar structural elements or features of the subject invention, there is illustrated in FIG. 1 the carbon monoxide (CO) gas detection and warning system of the subject invention, which is designated generally by reference numeral 10.

Referring to FIG. 1, the carbon monoxide gas detection and warning system 10 of the subject invention includes a portable phone device 12 and a phone case 14 that is dimensioned and configured to receive and protect the portable phone device 12. The phone case 14 has a gas detection or sensing circuit embedded therein for advantageously sensing carbon monoxide gas, which is shown schematically in FIGS. 2 and 4, and which is designated generally by reference numeral 20.

Figure 3:
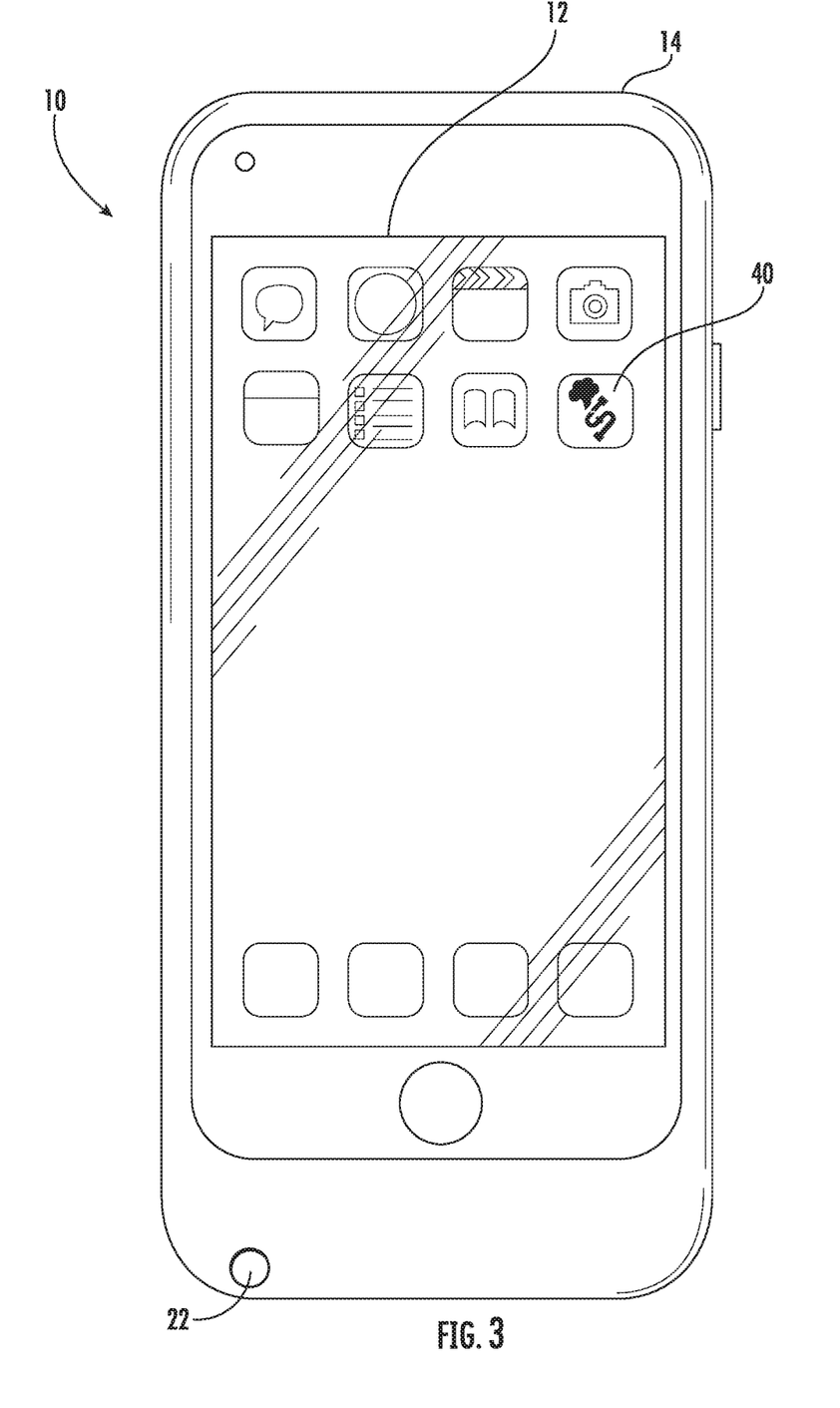
FIG. 3 is a front plan view of the system of the subject invention with the portable phone device enclosed within the phone case, and illustrating an icon that represents the gas detection algorithm stored on the phone device.

The portable phone device 12 has a gas detection application stored therein for communicating with the gas detection circuit 20 embedded in phone case 14, which is symbolized by the icon 40 illustrated in FIG. 3. The detection and warning system 10 is intended to protect users from exposure to CO in areas in which a CO detector is not typically installed, such as in cars, garages, construction sites where power may be supplied from a portable generator, or in a structure where code does not specifically require a CO detector.

With continuing reference to FIG. 1, the phone case 14 has a raised outer shell portion 16 that includes at least one, and preferably several, sensing ports 22 formed in the walls thereof for admitting carbon monoxide gas into the phone case 14. Those skilled in the art will readily appreciate that the location and number of sensing ports 22 can vary depending upon the size and shape of the phone case 14, as well as the make and model of the portable phone device 12.

Figure 5:
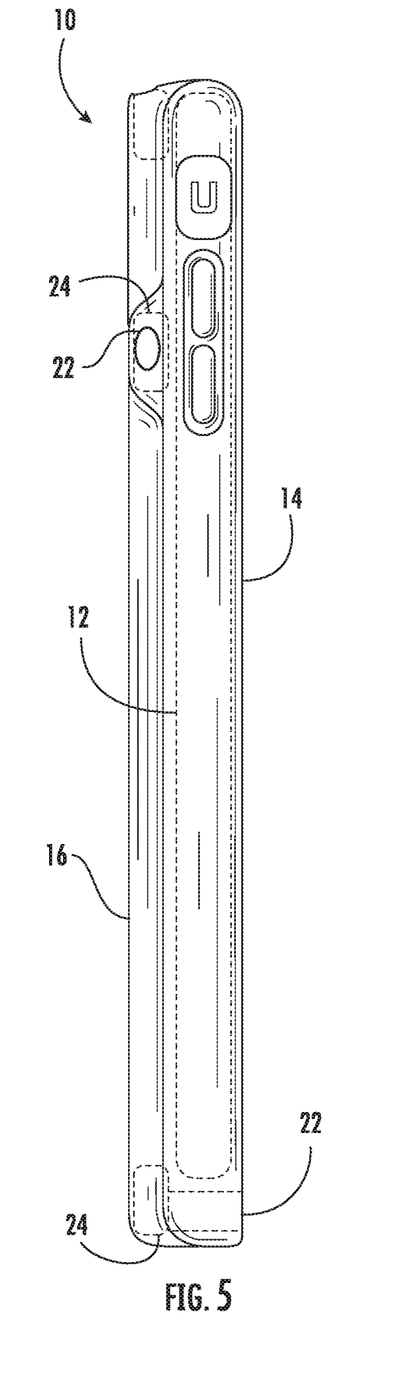
FIG. 5 is a left side elevational view of the system of the subject invention, showing the location of one of the sensing ports of the phone case.

By way of non-limiting example, five (5) separate sensing ports 22 are illustrated in the embodiment of FIG. 1, in various locations. Preferably, at least one sensing port 22 should be located on a surface of the phone case 14 that will remain substantially unobstructed when the system 10 is positioned on a supporting surface or structure. For example, a sensing port 22 would be provided on the front surface of the phone case 14 as shown in FIG. 3, or on the side surface of the phone case 14 as shown in FIG. 5.

Each sensing port 22 formed in the raised shell 16 communicates with a corresponding sensing chamber 24, wherein carbon monoxide gas can accumulate. Preferably, each sensing chamber 24 has a depth of about 20 mm and a width of about 30 mm so that a sufficient sample size of CO gas can accumulate for detection and measurement.

Figure 2:
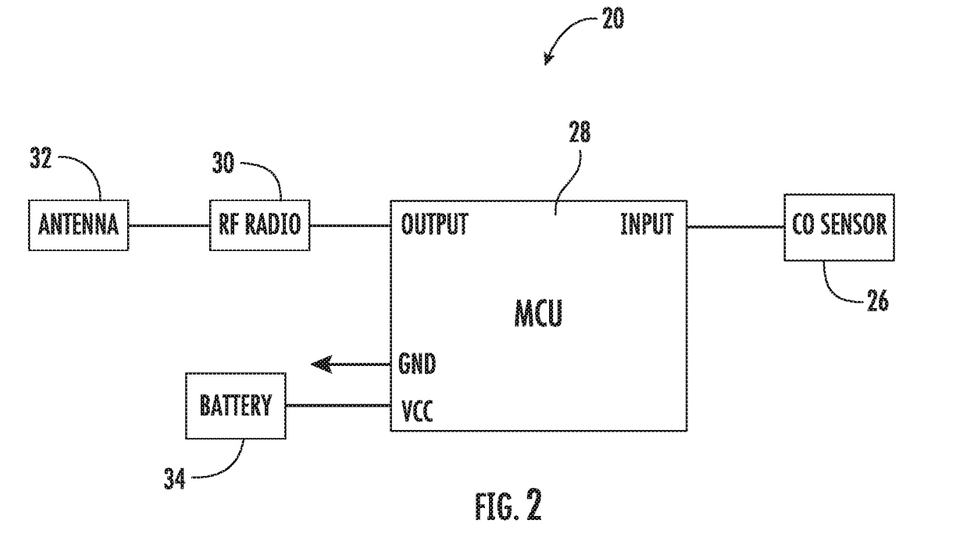
FIG. 2 is a schematic diagram of the gas detection circuit that is embedded in the phone case shown in FIG. 1.
Figure 4:
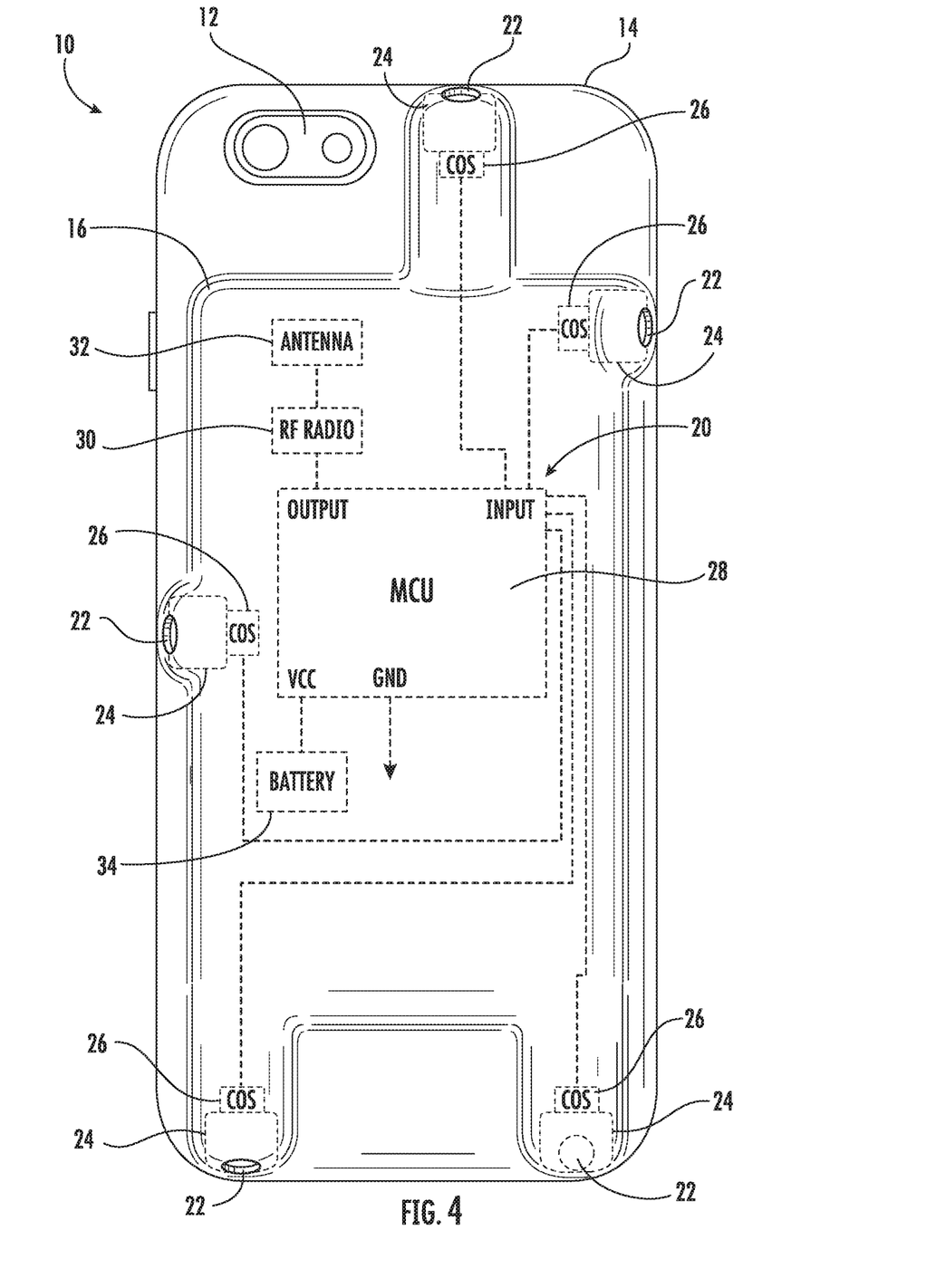
FIG. 4 is a rear plan view of the system of the subject invention with the portable phone device enclosed within the phone case, and illustrating the embedded gas detection circuit with plural sensing ports located in various areas on the phone case.

Referring to FIGS. 2 and 4, a carbon monoxide sensor (COS) 26 is operatively associated with the sensing chamber 24 of each sensing port 22 of the gas detection or sensing circuit 20 embedded within the raised outer shell 16 of phone case 14. The sensing port(s) 22 allow air and CO to travel to the sensor(s) 26.

Carbon monoxide sensors are well known in the art. Suitable examples of carbon monoxide sensors for use in the gas detection circuit 20 of the subject invention are manufactured and sold by Capteur Sensors, UK under the designation NGL07. These carbon monoxide sensors, which are typically used within residential CO detectors, are designed to exceed recommended standards for CO detectors, such as UL 2034 and BS 7860.

They are largely insensitive to fluctuations in relative humidity and can operate in reducing conditions such as biogas. They are physically small, have a low power requirement and are constructed by depositing a thick film layer of gas sensitive material onto an alumina substrate, which incorporates a platinum heater. The sensor operates as a gas sensitive resistor, wherein voltage is applied to the sensor to measure changes in its resistance corresponding to a rate of rise of carbon monoxide. Those skilled in the art will readily appreciate that other commercially available CO sensors can be used in the gas detection circuit 20.

With continuing reference to FIGS. 2 and 4, the gas sensing circuit 20 further includes a controller or main control unit (MCU) designated by reference numeral 28 for receiving an input signal in the form of a gas detection signal from the carbon monoxide sensor(s) 26, and for periodically sending an output signal to the portable phone device 12 by way of a wireless RF Radio transmitter 30. Preferably, the sensing circuit 20 of phone case 14 is configured to generate a wireless Bluetooth signal, and an antenna 32 is connected to the wireless RF transmitter 30 to communicate such signal to the portable phone device 12. Alternatively, it is envisioned that the sensing circuit 20 of phone case 14 can be connected directly to the portable phone device 12 by way of a wired connection or coupling with an available audio or data port.

The controller 28 of sensing circuit 20 is driven by a power source or battery 34, having an input at VCC and grounded at GND, as shown in FIG. 2. It is envisioned that the power source 34 could be a rechargeable power source or a replaceable power source. In the event the power source 34 is rechargeable, an appropriate connection point would be provided in the phone case 14 for engaging an AC power charger. In the event that the power source 34 is replaceable, an access port would be provided in the shell 16 of the phone case 14 for accessing and removing a DC battery.

The sensing circuit 20 generates a gas detection signal upon detection of carbon monoxide in the at least one sensing chamber 24. The sensing circuit 20 is configured to send an output signal to the portable phone device 12 indicative of the presence of carbon monoxide in the sensing chamber 24.

Referring to FIG. 3, the system 10 further includes a gas detection application stored on the portable phone device 12, which is symbolized by the icon 40 on the display of the phone device 12. The gas detection application 40 is operative or otherwise programmed to receive the output signal from the sensing circuit 20 and to determine if the carbon monoxide concentration present in one or more of the sensing chambers 24 exceeds a specified alarm level (e.g., 400 ppm).

Figure 7:
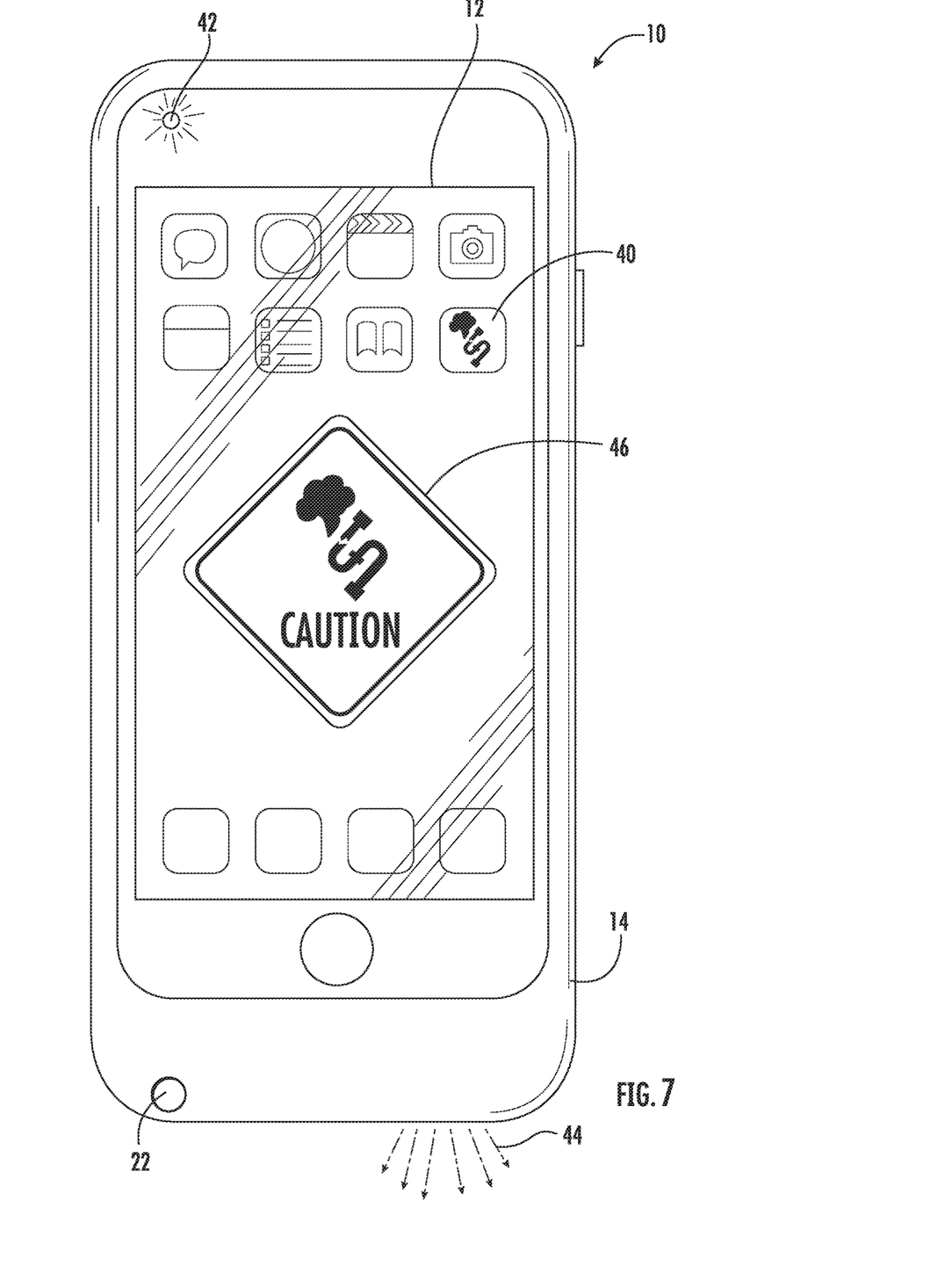
FIG. 7 is front plan view of the system of the subject invention with the portable phone device sounding an audible alarm and providing a visual alarm indicating that a detected level of carbon monoxide has exceeded a specified alarm level.

In essence, the gas detection application 40 includes an algorithm that calculates if the user of the phone device 12 should be notified of a dangerous CO condition. Moreover, the gas detection application 40 is programmed to cause the portable phone device 12 to emit an alarm signal if the carbon monoxide present exceeds a specified alarm level. As illustrated in FIG. 7, the alarm signal can be a visible warning signal such as a flashing LED 42 on the face or other visible surface of the phone device 12 and/or audible warning signal 44 emitted from a speaker 15 of the phone device 12, which is shown in FIG. 1. The system may also provide a visual indication of the alarm warning by providing a warning symbol 46 on the display of the phone device 12, and/or flash the screen of the device to attract the attention of the user (not shown).

Figure 6:
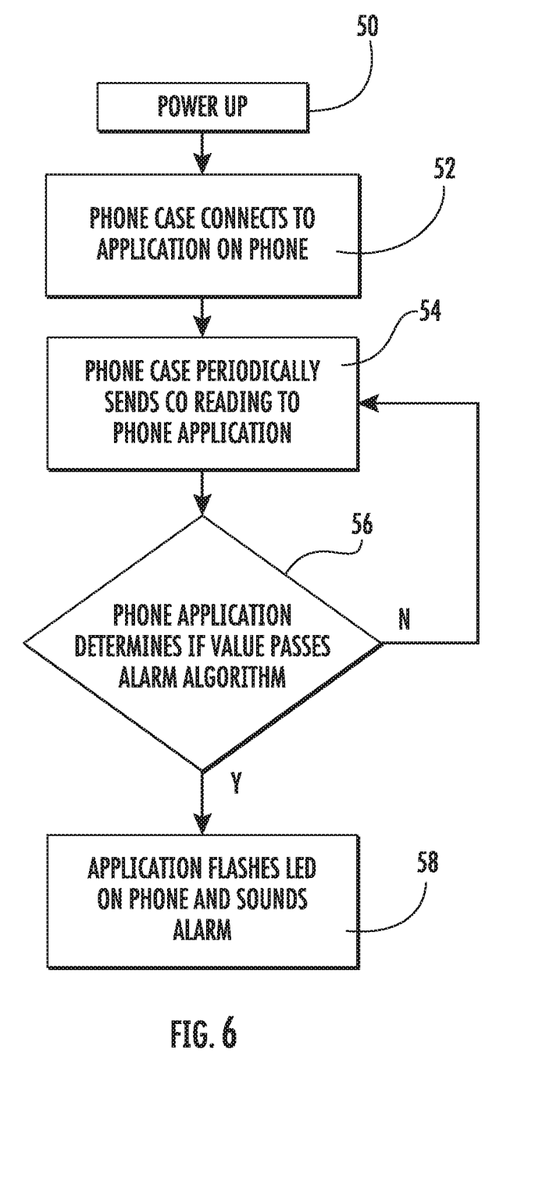
FIG. 6 is a flow chart illustrating the process steps employed by the carbon monoxide gas detection system of the subject invention.

Referring now to FIG. 6, when the phone case 14 is powered up at step 50, the carbon monoxide sensor(s) 26 of sensing circuit 20 are activated. Once activated, the CO sensors 26 of sensing circuit 20 will periodically scan the environment for CO. The scanning rate is preferably once every 4 seconds. At step 52, the controller 28 of the sensing circuit 20 in phone case 14 connects to the gas detection application 40 on the portable phone device 12 by way of the wireless transmitter 30 and its associated antennae 32. Alternatively, the communication may be conducted over a wired connection.

Thereafter, at step 54, the controller 28 periodically sends a carbon monoxide (CO) reading from the sensor(s) 26 of the sensing circuit 20 in phone case 14 to the gas detection application 40 stored on phone device 12. Preferably, the carbon monoxide (CO) reading is sent to the phone device 12 about once every two (2) minutes under normal conditions. Preferably, the frequency at which the output signals or (CO) readings are sent to the phone device 12 by controller 28 will increase upon the detection of carbon monoxide (CO) by the sensor(s) 26.

At step 56, the algorithm of the gas detection application 40 stored in phone device 12 will periodically determine if the carbon monoxide (CO) concentration present in the sensing chamber(s) 24 exceeds a specified threshold alarm level (e.g., 400 ppm). More specifically, the algorithm will check if a threshold concentration of CO is reached in a certain time interval. If the gas detection application 40 determines that the carbon monoxide (CO) concentration present in the sensing chamber(s) 24 is below the specified threshold alarm level, the application 40 will await a subsequent reading from the phone case 14. However, if the carbon monoxide (CO) concentration present in the sensing chamber(s) 24 exceeds the specified threshold alarm level at step 56, the gas detection application 40 will cause a visible and/or audible warning signal to be emitted by the phone device 12 at step 58. The controller 28 of sensing circuit 20 will operate in a low-power/sleep mode when it is not in use, so as to conserve battery power.

The gas detection application 40 is adapted and configured to maintain a log or record of the CO readings taken by the sensors 26 of sensing circuit 20 over a period of time. The application 40 enables a user to access and read the log or record, and the application 40 is further configured to generate historical reports of CO readings on the phone device 12 for access by the user.

While the subject disclosure has been shown and described with reference to a preferred embodiment, those skilled in the art will readily appreciate that changes and/or modifications may be made thereto without departing from the scope of the subject disclosure.

What is claimed is:

1. A carbon monoxide gas detection system for a portable phone device comprising:
   a) a phone case dimensioned and configured to receive a portable phone device, the phone case having an outer shell portion that includes two or more sensing chambers formed within a wall thereof, wherein each of the two or more sensing chambers communicates with a corresponding sensing port provided on an outer surface of the shell portion;
   b) a sensing circuit embedded in the outer shell portion of the phone case, the sensing circuit having a carbon monoxide sensor operatively associated with the two or more sensing chambers for generating a gas detection signal upon detection of carbon monoxide in the two or more sensing chambers, the sensing circuit being configured to send an output signal to the portable phone device indicative of the presence of carbon monoxide in the two or more sensing chambers, wherein the sensing circuit includes a controller, wherein each of the two or more sensing ports are on different sides of the outer shell portion, wherein each of the two or more sensing ports are connected to the controller; and
   c) a gas detection application stored on the portable phone device operative to receive the output signal from the sensing circuit and to determine if the carbon monoxide concentration present in the at least one sensing chamber exceeds a specified threshold alarm level.

2. The carbon monoxide gas detection system as recited in claim 1, wherein the gas detection application is programmed to cause the portable phone device to emit an alarm signal if the carbon monoxide concentration present in the two or more sensing chambers exceeds a specified threshold alarm level.

3. The carbon monoxide gas detection system as recited in claim 1, wherein the sensing port is located on a rear outer surface of the shell portion.

4. The carbon monoxide gas detection system as recited in claim 1, wherein the sensing port is located on a side outer surface of the shell portion.

5. The carbon monoxide gas detection system as recited in claim 1, wherein the alarm signal is a visual warning signal.

6. The carbon monoxide gas detection system as recited in claim 1, wherein the alarm signal is an audible warning signal.

7. The carbon monoxide gas detection system as recited in claim 1, wherein the sensing circuit further includes a power source.

8. The carbon monoxide gas detection system as recited in claim 7, wherein the power source is a rechargeable battery.

9. The carbon monoxide gas detection system as recited in claim 7, wherein the power source is a replaceable battery.

10. The carbon monoxide gas detection system as recited in claim 1, wherein the sensing circuit includes a controller for receiving the gas detection signal from the carbon monoxide sensor and for periodically sending the output signal to the portable phone device by way of a wireless transmitter.

11. The carbon monoxide gas detection system as recited in claim 10, wherein the sensing circuit is configured to generate a wireless Bluetooth signal.

12. The carbon monoxide gas detection system as recited in claim 11, wherein the sensing circuit further includes an antenna connected to the wireless transmitter.

13. The carbon monoxide gas detection system as recited in claim 1, wherein the two or more sensing chambers have a depth of about 20 mm and a width of about 30 mm.

14. The carbon monoxide gas detection system as recited in claim 1, wherein two of the two or more sensing ports are disposed on opposite sides of the shell portion.

15. The carbon monoxide gas detection system as recited in claim 1, wherein the outer shell portion has four sides, wherein each side of the shell portion contains a sensing port disposed therein.

16. A carbon monoxide gas detection system for a portable phone device comprising:
   a) a phone case dimensioned and configured to receive a portable phone device, the phone case having an outer shell portion that includes two or more sensing ports communicating with a corresponding sensing chamber formed within a wall of the outer shell portion; and
   b) a sensing circuit embedded in the outer shell portion of the phone case, the sensing circuit including a carbon monoxide sensor operatively associated with the sensing chamber of the two or more sensing ports for generating a gas detection signal upon detecting the presence of carbon monoxide gas in the sensing chamber, and a controller for receiving the gas detection signal from the carbon monoxide sensor and for periodically sending an output signal to the portable phone device by way of a wireless transmitter, wherein each of the two or more sensing ports are on different sides of the outer shell portion, wherein each of the two or more sensing ports are connected to the controller.

17. The carbon monoxide gas detection system as recited in claim 16, wherein the two or more sensing ports are located on a rear outer surface of the shell portion.

18. The carbon monoxide gas detection system as recited in claim 16, wherein the two or more sensing ports are located on a side outer surface of the shell portion.

19. The carbon monoxide gas detection system as recited in claim 16, wherein the two or more sensing chambers have a depth of about 20 mm and a width of about 30 mm.

20. The carbon monoxide gas detection system as recited in claim 16, wherein a gas detection application is stored on the portable phone device operative to receive the periodic output signal from the wireless transmitter of the sensing circuit and to determine if the carbon monoxide concentration present in the sensing chamber exceeds a specified threshold alarm level.

21. The carbon monoxide gas detection system as recited in claim 20, wherein the gas detection application is programmed to cause the portable phone device to issue an alarm signal when the carbon monoxide concentration present in the sensing chamber exceeds the specified threshold alarm level.

22. The carbon monoxide gas detection system as recited in claim 16, wherein two of the two or more sensing ports are disposed on opposite sides of the shell portion.

23. The carbon monoxide gas detection system as recited in claim 16, wherein the outer shell portion has four sides, wherein each side of the shell portion contains a sensing port disposed therein.

* * * * *